US009489379B1

(12) United States Patent
Wu et al.

(10) Patent No.: US 9,489,379 B1
(45) Date of Patent: Nov. 8, 2016

(54) PREDICTING DATA UNAVAILABILITY AND DATA LOSS EVENTS IN LARGE DATABASE SYSTEMS

(71) Applicants: Ben Wu, San Jose, CA (US); Derek Lin, San Mateo, CA (US); Deepesh Chaudhary, Foster City, CA (US); Lubomir P. Petrov, San Ramon, CA (US); Sagy Volkov, San Jose, CA (US)

(72) Inventors: Ben Wu, San Jose, CA (US); Derek Lin, San Mateo, CA (US); Deepesh Chaudhary, Foster City, CA (US); Lubomir P. Petrov, San Ramon, CA (US); Sagy Volkov, San Jose, CA (US)

(73) Assignee: EMC Corporation, Hopkinton, MA (US)

( * ) Notice: Subject to any disclaimer, the term of this patent is extended or adjusted under 35 U.S.C. 154(b) by 451 days.

(21) Appl. No.: 13/723,134

(22) Filed: Dec. 20, 2012

(51) Int. Cl.
*G06F 17/30* (2006.01)
*G06F 17/28* (2006.01)

(52) U.S. Cl.
CPC .............................. *G06F 17/30008* (2013.01)

(58) Field of Classification Search
CPC ................. G06F 17/30008; G06F 17/30286; G06F 17/30067; G06F 17/289; G06F 17/2872
USPC ........................................................ 707/690
See application file for complete search history.

(56) References Cited

U.S. PATENT DOCUMENTS

| 5,566,091 | A | * | 10/1996 | Schricker | F01N 11/002 340/439 |
| 5,991,707 | A | * | 11/1999 | Searles | G06C 23/02 324/71.3 |
| 6,192,365 | B1 | * | 2/2001 | Draper | G06F 9/466 707/648 |
| 6,917,952 | B1 | * | 7/2005 | Dailey | G06F 17/2715 |
| 8,316,263 | B1 | * | 11/2012 | Gough et al. | 714/47.3 |
| 2002/0165707 | A1 | * | 11/2002 | Call | 704/2 |
| 2005/0187744 | A1 | * | 8/2005 | Morrison | G06Q 10/06 703/2 |
| 2008/0183425 | A1 | * | 7/2008 | Hines | G06F 11/30 702/182 |
| 2008/0256397 | A1 | * | 10/2008 | Smith | G06F 11/008 714/47.3 |
| 2012/0079098 | A1 | * | 3/2012 | Moehler | G06F 11/0775 709/224 |
| 2014/0007186 | A1 | * | 1/2014 | Agrawal | G06F 21/60 726/1 |

\* cited by examiner

*Primary Examiner* — Hosain Alam
*Assistant Examiner* — Robert F May
(74) *Attorney, Agent, or Firm* — Barry N. Young

(57) ABSTRACT

Data unavailability and data loss events in a large distributed database system are predicted by proactively and substantially continuously collecting information about appliance states and operations in the database system, forming feature vectors of prescribed key information features, and classifying said feature vectors as indicative of possible DU/DL events based upon their similarity and closeness to stored historical feature vectors known to be relevant to DU/DL events.

20 Claims, 5 Drawing Sheets

PREDICTING DATA UNAVAILABILITY AND DATA LOSS EVENTS IN LARGE DATABASE SYSTEMS

BACKGROUND

This invention relates generally to systems and methods for predictive analytics, and more particularly to predicting events in large data processing systems, such as large distributed database systems, that can result in data unavailability and data loss.

Manufacturers and vendors of data processing systems typically provide support services to their customers. While the manufacturers and vendors customarily issue software updates to correct bugs or to provide added functionality, and, on occasion, may also recall and replace hardware components that have design defects, these support services are generally reactive. When a customer reports a problem, technical support personnel attempt to collect operating information about the system at the time of the problem, diagnose its cause, and provide a fix. This reactive approach can be time-consuming, expensive and result in the system being unavailable to the customer or the loss of critical data, which are generally unacceptable. Very seldom, if ever, do manufacturers and vendors proactively attempt to predict and address problems with their products operating at customers' sites before the problems occur. This may be due to the difficulty of predicting failures accurately.

The problems associated with data unavailability/data loss (DU/DL) are particularly critical with large database systems, particularly those used for transaction processing where any system downtime or loss of data is unacceptable. As a result, such systems are typically engineered with high redundancy and backup which increases their costs and complexity. This approach can minimize data loss, and sometimes data unavailability, but it does not predict and prevent problems before they occur and does not necessarily avoid system downtime.

It is desirable to provide systems and methods that address the foregoing and other problems associated with predicting failures in data processing systems, and that afford a proactive predictive approach for identifying possible data unavailability/data loss events before they occur. It is to these ends that the present invention is directed.

DESCRIPTION OF PREFERRED EMBODIMENTS

This invention is particularly well adapted for use with large distributed database systems used, for example, for data warehousing or transaction processing, and will be described in that context. It will be appreciated, however, that this is illustrative of only one utility of the invention, and that the invention has applicability to other types of data processing systems.

Figure 1:
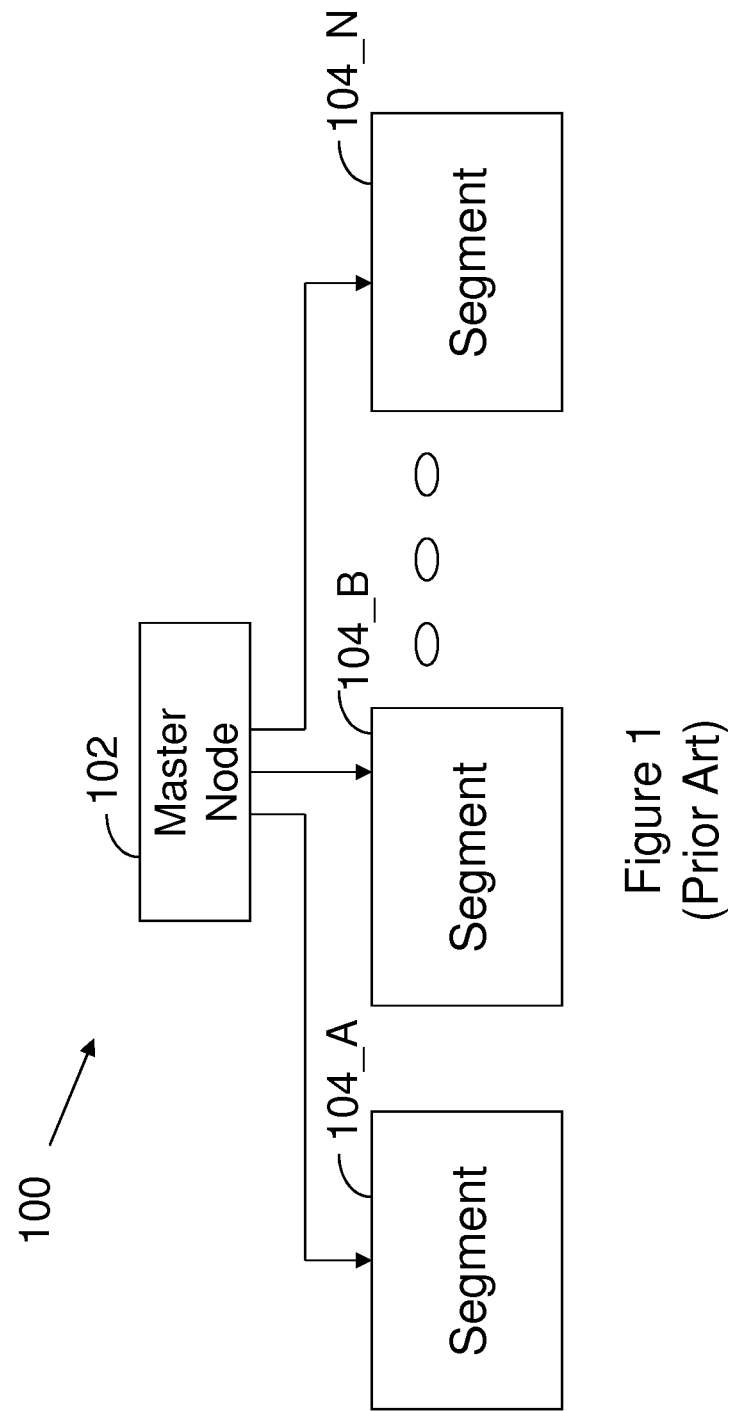
FIG. 1 is a diagrammatic view of a distributed database system of the type to which the invention may be applied.

FIG. 1 illustrates the architecture of one type of computer processing system 100 with which the predictive analysis approach of the invention may be employed, the computer system being a massively parallel processor (MPP) distributed database cluster (system). The database system may include a master node 102 which connects to a plurality of segment nodes 104_A through 104_N. Each segment node may comprise one or more database (DB) segments (database instances), including one or more primary databases and one or more mirror databases. The master and segment nodes may comprise generally similar server systems having similar general architectures and process models. They operate together to process user requests (queries) and return results, and all server systems (nodes) must work together and function properly to process workloads.

Figure 2:
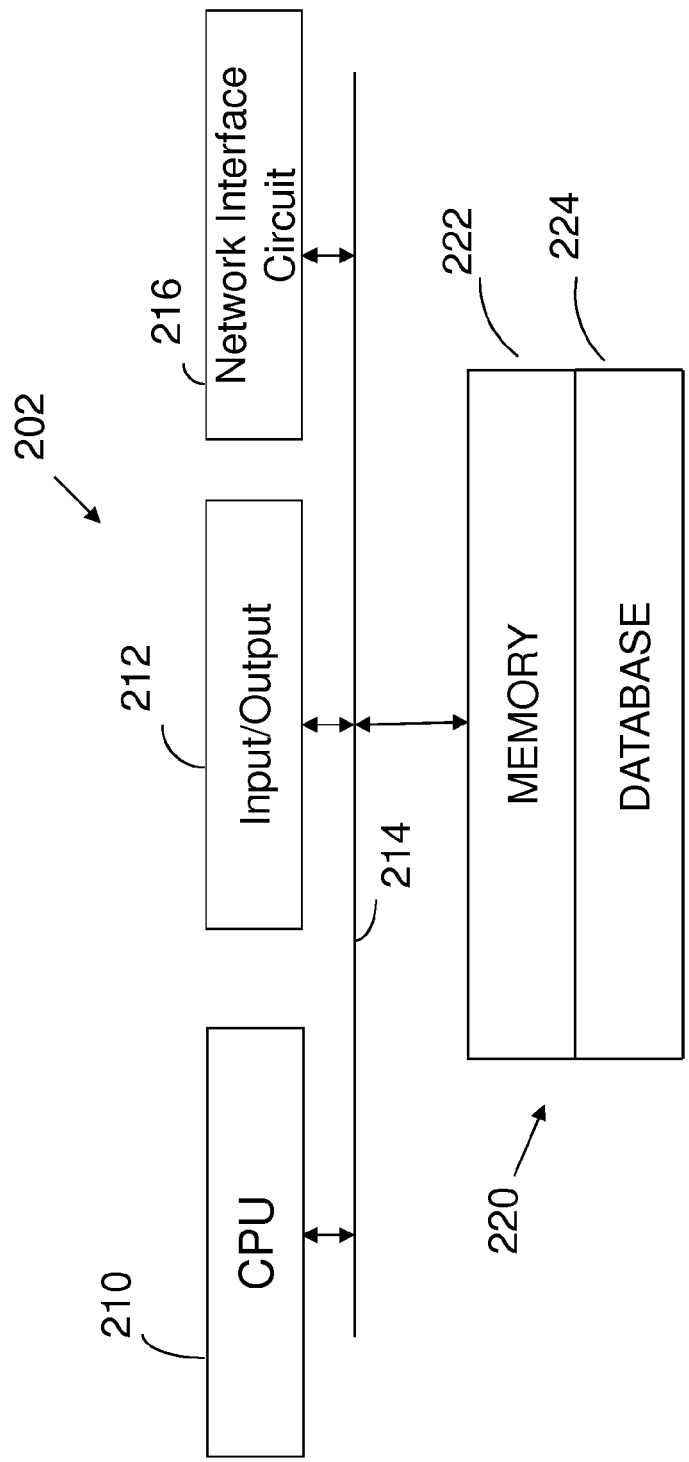
FIG. 2 illustrates architecture of a node of the database system of FIG. 1.

FIG. 2 illustrates an example of the architecture of a master node 202 of the database system that is configured to perform processes and operations in accordance with the invention. The master node and the segment nodes may have substantially similar architectures, as stated above. The master node 202 may comprise a host computer server system 210 (which may comprise a single CPU or may be a multi-processor system comprising a plurality of CPUs) connected to input/output (I/O) devices 212 by a bus 214. The I/O devices may be standard computer system input and output devices. A network interface circuit 216 may also be connected to bus 214 to allow the master node to operate in a networked environment. The master node may further have storage 220 comprising non-transitory physical storage media connected to the bus that embodies executable instructions, such as an operating system and application programs, to control the operations of the computer system. Storage 220 may include a main memory 222 comprising instructions that control the CPU to operate in accordance with the invention, as will be described, and may contain other storage 224 including a database and storing system configuration information, logs, applications, and utilities.

As will be described in more detail, the invention affords a system and method to proactively monitor a data processing system, such as a distributed database cluster of the type illustrated in FIG. 1, to automatically, dynamically and continuously in real time collect state and system operating information that may be analyzed using a predictive analysis system to anticipate and predict data unavailability and data loss (DU/DL) events so that they may be prevented. The analysis system of the invention may collect structured and unstructured data from a variety of different sources from which a prediction model can be built, and the analysis system may analyze and correlate the automatically, dynamically and continuously collected operating state data from the database system with the prediction model to predict DU/DL events. Structured data includes both numerical data such as the amount of query memory used, free disk space and the number of user accounts, and includes categorical data such as version information and configuration settings. Unstructured data comprises text records such as e-mail reports between technical support staff relating to problems, which may include both natural language text and programming codes. The prediction model analyzes and correlates current state information against stored historical data comprising previously collected state data, the analysis results of previously collected data, and other information known to likely cause a DU/DL event.

Generally, as will be described, the invention affords a predictive analysis system and method that monitor and capture a large number and variety of prescribed features that relate to the states of various appliances in the database cluster, and represent the states in data sets. Preferably the data sets are formed to be high dimensional feature (state) vectors, where each feature (state value of a data set) corresponds to a variable of a feature vector. The features monitored and captured may be any prescribed set of features that may characterize the operation, performance and state of the database nodes. Since the causes of failures are seldom predictable or known in advance, it is desirable to capture as many as possible of all features (states) of the system that could have any conceivable relationship to a failure. Among many others, the features monitored and captured may include: % of CPU used; % of memory used; the number of times the term "catalog corruption" occurs in trouble reports or logs; the number of concurrent vacuum steps or other concurrent database operations performed; the database size, etc. Additional external features may also be derived, such as the "% of CPU used now" and the "% of CPU used 24 hours ago" that are indicative of a trend. Features may also include knowledge of support personnel, and unstructured text relating to domain knowledge. Other features will be described below. In general, a very large number of features may be prescribed for collection. The result of forming the data set into vectors in vector space is a collection or matrix of feature (state) vectors, each representing the state at a given time for appliances of the database system to which machine learning models may be applied. An advantage of forming the collected data sets into feature vectors is that known mathematical predictive analytics can be applied to analyzing and characterizing the data, as will be described. Some previously collected feature vectors may be classified and labeled as a DU/DL event based upon analysis or actual outcome, as will be described. The analysis system may correlate current state feature vectors with previously classified and stored data to identify and classify those feature vectors known to cause or likely to cause problems as DU/DL event feature vectors, and may output alerts for appropriate action. Also, current feature vectors may be compared with and correlated to stored historical data and feature vectors previously determined to be related to DU/DL events to predict possible future DU/DL events.

Figure 3:
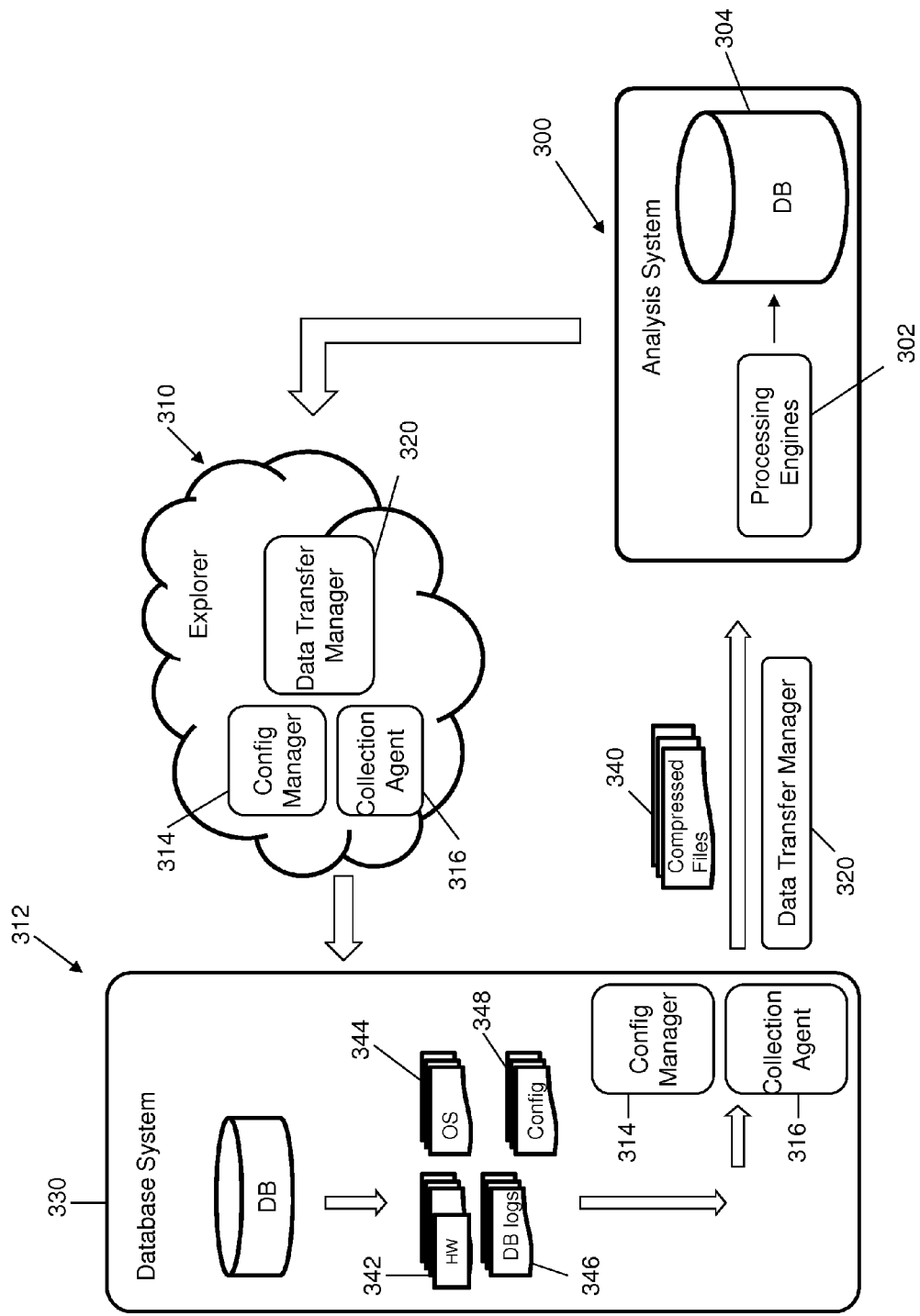
FIG. 3 is an overview of an embodiment of a predictive analysis system in accordance with the invention as applied to a distributed database system.

FIG. 3 illustrates an overview of application of an analysis system and method in accordance with the invention to a remote database system (as at customer facilities) such as the database cluster 100 of FIG. 1. As shown, the analysis system 300 may include processing engines 302 and storage 304 such as a database in which collected data and analysis results may be stored, as will be described more fully in connection with FIG. 4. The analysis system may be connected via a network to the database system 312, and preferably comprises a database system similar to database system 100 with one or more nodes having similar architectures to that illustrated in FIG. 2. The analysis system provides an explorer framework 310 to the database cluster 312. The explorer framework may include a configuration manager 314, a collection agent 316, and a data transfer manager 320. The explorer framework may be provided to the master node 330 of the database system, and, in a preferred embodiment, the master node distributes the explorer framework to the various segments of the cluster.

The collection agents 316 on each of the segment nodes actively collect prescribed data about the states of the appliances, operating conditions, etc. The master node 330 may gather the collected data from each of the segment nodes, and the configuration manager 316 may configure the collected data from the segment nodes and the master node as compressed files 340 for transfer by the data transfer manager 320 to the analysis system 300. As shown in FIG. 3, the data collected by the collection agent may collect a wide variety of data and information, including hardware (HW) information 342, operating system (OS) or other software information 344, database (DB) system logs 346, and configuration (process) information 348. Additionally, the collection agent preferably also collects environmental information about the customer's data center facilities that may be relevant to operating performance, e.g., electrical power stability, power outages, etc.

Figure 4:
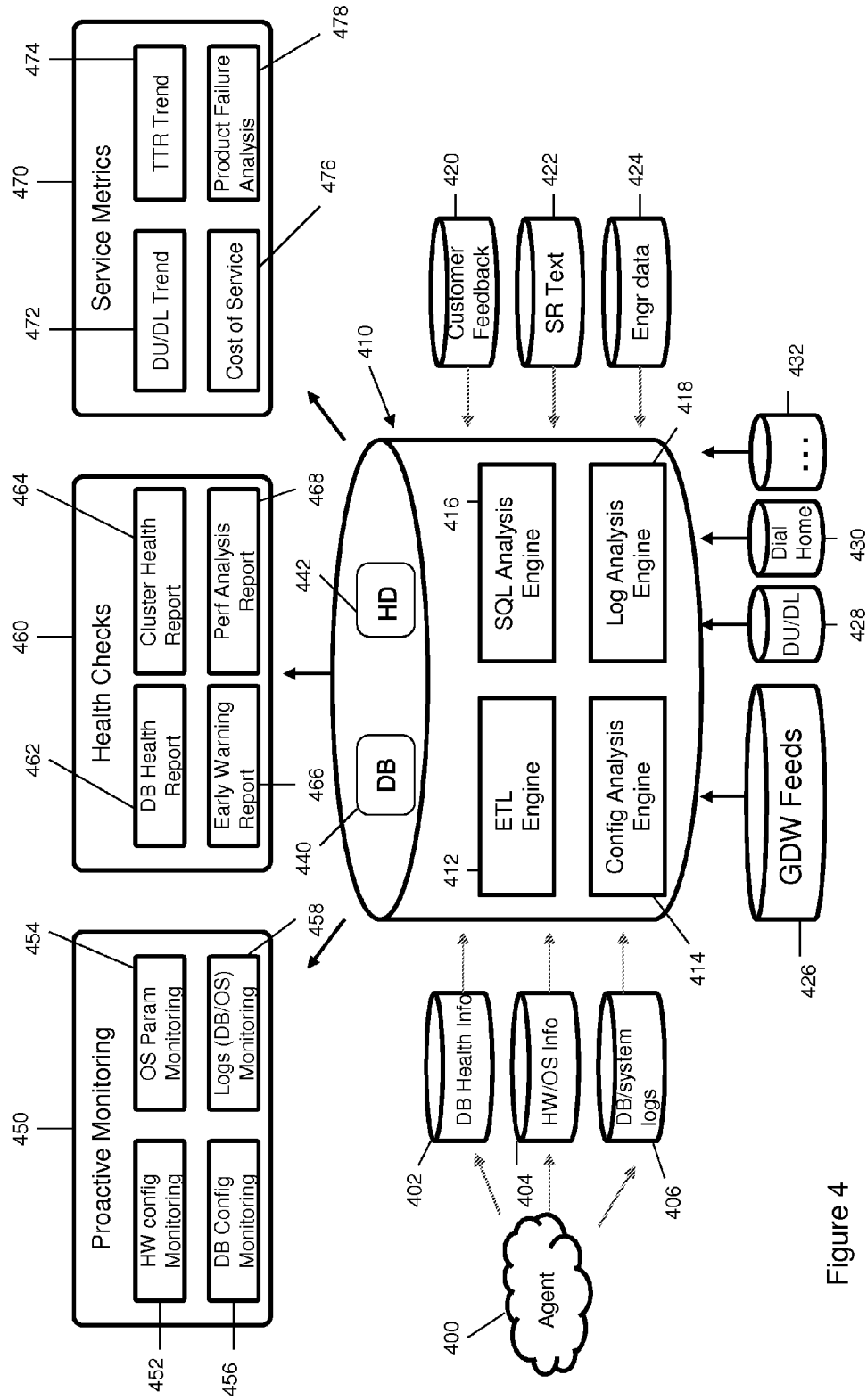
FIG. 4 is a diagrammatic view illustrating in more detail an embodiment of an analysis system in accordance with the invention.

FIG. 4 illustrates in more detail the configuration of the analysis system and examples of the types of information it collects. As shown in the figure, a collection agent 400, such as agent 316 of FIG. 3, collects database health information 402, hardware/operating system information 404 and database system logs 406 and provides this information to the analysis system 410. The analysis system 410 may comprise a plurality of processing engines, including an extract, transform and load engine 412, a configuration analysis engine 414, a SQL analysis engine 416, and a log analysis engine 418. Each of these engines may comprise processes running on one or more CPUs, and may perform different types of analysis.

The ETL engine 412 may extract data and information provided to the analysis system, transform the data and information, and load it into tables for analysis and storage. The configuration analysis engine 414 may analyze various settings related to the environment of the database system, and compare these with best practices and other known information related to performance. The SQL analysis engine 416 may perform an analysis of SQL statements and correlate these with appliance state information provided by the agent. The particular SOL statements being executed by the system at the precise time that a particular state feature is captured may correlate with that state feature and may be relevant for diagnosing and predicting problems. The log analysis engine 418 may analyze the database logs collected by the agent and focus on error messages in the logs.

The analysis system may also receive other kinds of information, including customer feedback 420 which may include survey information from customers about the database system, service requests (SR) text 422 comprising textual information exchanges, e.g., e-mails, about problems among service personnel and database system customers, and engineering data 424 from a bug and problem tracking system. The system may additionally collect global data warehouse (GDW) information 426 about the customers' industry, previously collected information about DU/DL events 428, dial home information 430 provided by a status reporting framework on the database system under test, and miscellaneous other relevant data 432. The various collected data and other information provided to the analysis system and the results of the analysis from the processing engines may be stored in a database 440 and in a Hadoop system 442. Hadoop systems are advantageous for parallel processing of large amounts of data, such as log files.

The analysis system 410 may also store data and analysis results, and present this information to interested entities. The system may provide, for instance, proactive monitoring information 450 about the data and parameters relating to hardware configuration 452, operating system 454, database configuration 456, and log (DB/OS) information 458. The system may additionally provide health check reports 460 relating to the database health 462, cluster health 464, early warnings of possible problems 466, and performance analysis 468. The system may additionally provide information as to the overall operation in the form of service metrics 470, to include DU/DL trends 472, TPR trends 474, cost of service 476, and product failure analysis 478.

Figure 5:
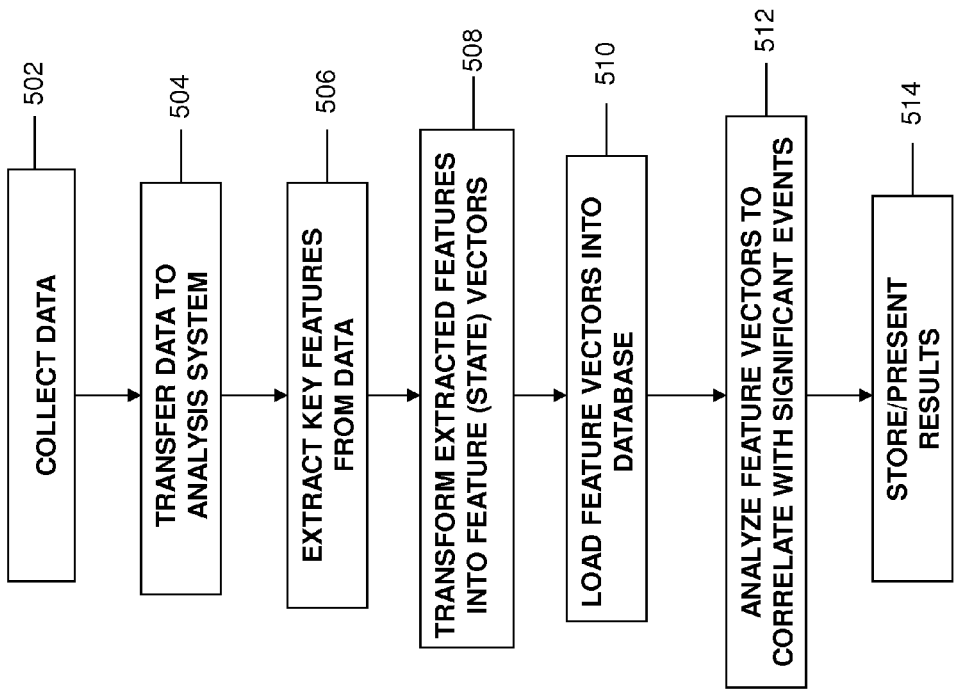
FIG. 5 is a flow diagram illustrating an overview of a predictive analysis process in accordance with an embodiment of the invention.

FIG. 5 is a flow diagram that illustrates an embodiment of an overall predictive analysis process in accordance with the invention. At 502, data is collected from a system under test, such as the remote distributed database system 100 of FIG. 1, as described above in connection with FIGS. 3 and 4. As previously described, all data that has any possible relevance may be collected. At 504, the data is transferred to the analysis system. In one embodiment as shown at 506, the analysis system extracts prescribed key features from the data. Alternatively, the prescribed key features may be used to define the data that is collected by the agent at the system under test. In one embodiment, the key features may be predetermined and entered into a list in the system. In another embodiment key features may be identified dynamically, as during data extraction. At 508, the extracted key features may be transformed into data sets, e.g., feature vectors, as previously described, which represent the states of the appliances in the system at the times the features were captured. At 510, the feature vectors are loaded into the database. At 512, the feature vectors are analyzed to classify them and correlate them with historically significant events and other stored information, in a manner which will be described below, and the results are stored and presented at 514.

The analysis of feature vectors at step 512 may be done in different ways. The objective of the analysis at 512 is to identify and to predict operating states of appliances in the system under test that have previously caused or which have the potential to cause DU/DL events. The invention employs feature engineering principles to select features for collection and monitoring, and forms the data sets into new feature vectors comprising the key features representing the current operating states of the appliances at the times data is captured. These new feature vectors are correlated with a collection of stored feature vectors and other historical data to identify conditions that are known to cause or are likely to cause DU/DL events. The stored feature vectors against which the new feature vectors are correlated may include vectors representing signature states, i.e., those previously identified states that have resulted in a DU/DL event. Another approach which may be used for the analysis is to detect sets of anomalies in the collected features of the system being tested that have a probability of causing a DU/DL event. Probabilities may be estimated by the the analysis process of the invention by determining the "closeness" of a feature vector comprising a set of collected features to known or suspected states and conditions that were previously identified to be problems. Closeness may be determined by correlating the collected feature vectors with stored feature vectors and historical data to determine a "distance" between data sets, and identifying and predicting problematic states based upon the degree of closeness.

One approach to determining closeness of feature vectors is to use a classification model based upon a training set formed from historical data. Stored feature vectors may include a label to indicate whether the stored feature vector represents a DU/DL event or is suspected to represent a DU/DL event. A collection of stored feature vectors may comprise the training set and be used in a supervised machine learning model, such as a vector machine, a neural network, or decision trees to classify new feature vectors. A new feature vector representing the state of an appliance may be given a score based upon its closeness to the training set and classified as a DU/DL event by comparing the score to a predetermined threshold.

Mathematical analytics may be used to determine closeness. A preferred approach is based upon an information retrieval technique similar to the well-known Latent Semantic Indexing (LSI) method which is used for indexing and retrieval of semantically similar documents. LSI uses the well-known mathematical technique of singular value decomposition (SVD) to identify patterns in the relationships between terms and concepts contained in unstructured text. Given a query document, LSI retrieves documents from a stored collection of documents that are semantically similar (close) to the query document.

In a preferred embodiment, the invention uses a LSI modeling framework to construct a feature matrix by joining feature vectors as columns in the matrix. Next, an SVD operation may be applied to the matrix to obtain a rank-reduced vector space. Given a new state of an appliance represented by a new feature vector, the new feature vector may be first mapped to the rank-reduced space by computing a cosine-similarity distance against the historical stored vectors, using well known techniques. Finally, a predetermined threshold may be used to identify which of the historical vectors are "close" to the new feature vector based upon the cosine-similarity distance, and these may be retrieved. The degree of "closeness" of the retrieved vectors may be gauged by appropriate selection of predetermined thresholds. If any of the retrieved feature vectors is labeled as a DU/DL event, the system may issue an alert so that the new feature vector may be analyzed more closely to determine a likely cause of the DU/DL event. Likewise, if the anomalies in the feature vector exceed a predetermine number, it may be classified as a possible DU/DL event.

The invention has advantages over simple rules-based approaches which have been used to predict DU/DL events based upon static states of appliances, such as version numbers, matches to past events, etc. In contrast to such approaches, a system and method in accordance with the invention is more robust in being able to capture and analyze dynamic state information in real time, and to handle dynamically changing usages and system behaviors. Additionally, by being able to handle greater quantities and types of data in real time, and being able to statistically compare such state information to historical data, the invention provides greater accuracy in predicting DU/DL events.

While the foregoing has been with respect to particular embodiments of the invention, it will be appreciated by those skilled in the art that changes to these embodiments may be made without departing from the principles and spirit of the invention, the scope of which is defined by the appended claims.

The invention claimed is:

1. A method of predicting data unavailability and data loss (DU/DL) events in a database system, comprising:
   collecting current state data about database appliances and the database system, said state data comprising unstructured textual records comprising natural language text relating to the operating states of database appliances and the database system;
   forming a first data set containing the collected current state data, said first data set characterizing the database system at the time the state data was collected;

processing said unstructured textual records of said first data set directly in unstructured form using machine learning to produce a first numerical score for said first data set;

analyzing directly said unstructured textual records of said first data set in said unstructured form with respect to a historical second data set that is relevant to a previous DU/DL event using said first numerical score and a second numerical score for unstructured textual records in unstructured form of the second data set to identify related conditions, wherein said unstructured textual records of said first and second data sets comprise textual information in service requests about problems; and predicting using machine learning a numerical probability of a DU/DL event occurring in said database system based upon said related conditions.

2. The method of claim 1, wherein said analyzing comprises analyzing said first data set with respect to a selected said second data set that has a second numerical score that is within a predetermined numerical degree of closeness to said first numerical score to predict said probability of a DU/DL event.

3. The method of claim 1, wherein said unstructured textual records of said first and second data sets further comprise database configuration information, and workflow processing operations information, and said analyzing comprises correlating said first data set with respect to said second data set to predict said numerical probability.

4. The method of claim 3, wherein said forming said first data set comprises forming a multi-dimensional state vector where each variable of said state vector has a value corresponding to a state value of the first data set, and classifying the first data set as indicative of a possible DU/DL event based upon said numerical probability.

5. The method of claim 1, wherein said forming said first data set comprises forming a first feature vector of key features representing said current state data about appliance states and operating conditions, and wherein said analyzing comprises computing a distance using mathematical predictive analytics between said first feature vector and second feature vectors formed from the second data set.

6. The method of claim 5 further comprising determining said first and second numerical scores for said first and second data sets using latent semantic indexing, and the method further comprising determining similarity between said first and second feature vectors based upon closeness of said numerical scores.

7. The method of claim 1, where said collected current state data further comprises structured numerical data characterizing database system appliances and workflow processes, and said predicting comprises correlating said current structured numerical data with historical structured numerical data.

8. The method of claim 1, wherein said current collected state data further comprises textual records from database system logs and information about environmental conditions in the database system.

9. The method of claim 1 further comprising transferring said collected current state data to a remote analysis system, and wherein said remote analysis system performs said forming, analyzing and predicting.

10. A method of predicting data unavailability and data loss (DU/DL) events in a database system, comprising:

monitoring and collecting in real time current state data about appliances and operations of said database system, said state data comprising unstructured textual records comprising natural language text relating to the operating states of the database appliances and the database system;

extracting first information about key features of the database system directly from said unstructured textual records of said current state data, and forming a first data set containing said first information;

processing said unstructured textual records of said first data set directly in unstructured form using machine learning to produce a first numerical score for the first data set;

identifying unstructured textual records of one or more second data sets of historical information that are relevant to a previous DU/DL event using said first numerical score and a second numerical score for the unstructured textual records of said one or more second data sets;

determining a measure of similarity between said first data set and said identified one or more second data sets directly from said unstructured textual records in unstructured form of said first and one or more second data sets, wherein said unstructured textual records of said first and said one or more second data sets comprise textual information in service requests about problems; and predicting using machine learning a probability of a DU/DL event based upon said measure of similarity.

11. The method of claim 10, wherein said identifying one or more second data sets comprises comparing said first data set to said second data sets to detect similar patterns in the first information and in the historical information, and wherein said determining said measure of similarity comprises determining a numerical closeness between the first information in said first data set and the historical information in the second data sets.

12. The method of claim 10, wherein said first and said second data sets respectively comprise a first feature vector and second feature vectors, and said identifying comprises computing a distance measure between said first and each of said second feature vectors, and said determining comprises determining similarity between feature vectors based upon said distance measures.

13. The method of claim 10, wherein said database system comprises a master node and a plurality of segment nodes connected via a network to said master node, and wherein said monitoring and collecting is performed by agent processes executing on each of the nodes that collect said current state data about database appliances and operations, wherein the master node gathers said current state data from each of the segments and forwards the current state data to a remote predictive analysis system configured to perform said extracting, processing, identifying, determining, and predicting.

14. The method of claim 13, wherein said predicting is further based upon machine learning textual analysis of database system logs and other information external to said database system that is supplied to the analysis system.

15. A computer program product comprising a non-transitory storage medium for storing executable instructions for controlling the operation of a computer, comprising instructions for:

monitoring and collecting in real time current state data about appliances and operations of said database system, said state data comprising unstructured textual records comprising natural language text relating to the operating states of the database appliances and the database system;

extracting first information about key features of the database system directly from said unstructured textual records of said current state data, and forming a first data set containing said first information;

processing said unstructured textual records of said first data set directly in unstructured form using machine learning to produce a first numerical score for the first data set;

identifying unstructured textual records of one or more second data sets of historical information that are relevant to a previous DU/DL event using said first numerical score and a second numerical score for the unstructured textual records of said one or more second data sets;

determining a measure of similarity between said first data set and said identified one or more second data sets directly from said unstructured textual records in unstructured form of said first and one or more second data sets, wherein said unstructured textual records of said first and said one or more second data sets comprise textual information in service requests about problems; and predicting using machine learning a probability of a DU/DL event based upon said measure of similarity.

16. The computer program product of claim 15, wherein said identifying one or more second data sets comprises instructions for comparing said first data set to said second data sets to detect similar patterns in the first information and in the historical information, and wherein said determining said measure of similarity comprises determining a numerical closeness between the first information in said first data set and the historical information in the second data sets.

17. The computer program product of claim 15, wherein said first and said second data sets respectively comprise a first feature vector and second feature vectors, and said identifying comprises instructions for computing a distance measure between said first and second feature vectors, and said determining comprises determining similarity between feature vectors based upon said distance measures.

18. The computer program product of claim 15, wherein said identifying comprises comparing said first data set with said second data sets relevant to a DU/DL event, and classifying the first data set as indicative of a possible DU/DL event based upon the numerical scores of said first and said second data sets.

19. The computer program product of claim 15, wherein said database system comprises a master node and a plurality of segment nodes connected via a network to said master node, and wherein said monitoring and collecting is performed by agent processes executing on each of the nodes that collect said current state data about database appliances and operations, wherein the master node gathers said current state data from each of the segments and forwards the current state data to a remote predictive analysis system configured to perform said extracting, processing, identifying, determining and predicting.

20. The computer program product of claim 15, wherein said predicting further comprises instructions for predicting based upon machine learning textual analysis of database system logs and other information external to said database system that is supplied to the analysis system.

* * * * *